United States Patent
Liu

(10) Patent No.: US 12,075,349 B2
(45) Date of Patent: Aug. 27, 2024

(54) METHOD AND DEVICE FOR COMMUNICATION

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 357 days.

(21) Appl. No.: 17/185,366

(22) Filed: Feb. 25, 2021

(65) Prior Publication Data

US 2021/0185605 A1 Jun. 17, 2021

Related U.S. Application Data

(63) Continuation of application No. PCT/CN2018/103086, filed on Aug. 29, 2018.

(51) Int. Cl.
*H04W 76/11* (2018.01)
*H04W 28/02* (2009.01)
*H04W 48/06* (2009.01)
*H04W 48/16* (2009.01)
*H04W 48/20* (2009.01)

(52) U.S. Cl.
CPC ....... *H04W 48/20* (2013.01); *H04W 28/0268* (2013.01); *H04W 48/06* (2013.01); *H04W 48/16* (2013.01); *H04W 76/11* (2018.02)

(58) Field of Classification Search
CPC . H04W 48/20; H04W 28/0268; H04W 48/06; H04W 48/16; H04W 76/11; H04W 24/02; H04W 40/24; H04L 47/78; H04L 47/803; H04L 47/805; H04L 47/828
See application file for complete search history.

(56) References Cited

U.S. PATENT DOCUMENTS

| | | | | |
|---|---|---|---|---|
| 9,386,423 | B2 * | 7/2016 | Quan | H04W 4/06 |
| 9,680,921 | B2 | 6/2017 | Han et al. | |
| 10,425,987 | B2 * | 9/2019 | Yang | H04W 36/00835 |
| 10,588,074 | B2 * | 3/2020 | Duan | H04W 36/165 |

(Continued)

FOREIGN PATENT DOCUMENTS

| | | |
|---|---|---|
| CN | 101019460 A | 8/2007 |
| CN | 101345905 A | 1/2009 |

(Continued)

OTHER PUBLICATIONS

EPO, Extended European Search Report for EP Application No. 18931628.4, Sep. 10, 2021.

(Continued)

*Primary Examiner* — Said M Elnoubi
(74) *Attorney, Agent, or Firm* — Hodgson Russ LLP

(57) ABSTRACT

The embodiments of the present application relate to a method and device for communications. The method comprises: a terminal device determines a target group; and, the terminal device joins the target group to communicate with a network side. The method and device for communications of the embodiments of the present application implement the fine-grained management of a network.

3 Claims, 5 Drawing Sheets

300

Send, by a network device, indication information to a terminal device, wherein the indication information is used to instruct the terminal device to determine a target group — 310

Receive, by the network device, information for joining sent from the terminal device, wherein the information for joining is used to request to join the target group, and the information for joining includes identification information of the terminal device and attribute information of the target group — 320

In response to the information for joining, send, by the network device, second feedback information to the terminal device — 330

(56) References Cited

U.S. PATENT DOCUMENTS

| | | | | |
|---|---|---|---|---|
| 2006/0030348 A1* | 2/2006 | Drozt | ............... | H04M 1/72448 |
| | | | | 455/519 |
| 2015/0281382 A1* | 10/2015 | Xue | ...................... | H04W 4/02 |
| | | | | 709/203 |
| 2019/0174320 A1* | 6/2019 | Kodaypak | ............. | H04L 41/00 |

FOREIGN PATENT DOCUMENTS

| | | | | |
|---|---|---|---|---|
| CN | 101459879 | | 6/2009 | |
| CN | 102857873 A | | 1/2013 | |
| CN | 106375987 A | | 2/2017 | |
| CN | 107318097 | | 11/2017 | |
| CN | 107404344 A | | 11/2017 | |
| EP | 2424277 | | 2/2012 | |
| EP | 2424277 A1 | * | 2/2012 | ............. H04L 67/16 |
| GB | 2500178 | | 9/2013 | |
| GB | 2500178 A | * | 9/2013 | .......... H04W 72/082 |
| WO | 2017185755 A1 | | 11/2017 | |

OTHER PUBLICATIONS

Intel, "Solution for support of 5G LAN-type service and 5GLAN communication," SA WG2 Meeting #128-BIS, S2-188498 (revision of S2-188379), Aug. 2018.
EPO, Communication for EP Application No. 18931628.4, Jun. 21, 2022.
WIPO, ISR for PCT/CN2018/103086, May 29, 2019.
WIPO, WO for PCT/CN2018/103086, May 29, 2019.
EPO, Communication for EP Application No. 18931628.4, May 8, 2023.
CNIPA, First Office Action for CN Application No. 202210391855.6, Jun. 8, 2023.
CNIPA, Notice of Priority Review of Patent Application for CN Application No. 202210391855.6, Jun. 7, 2023.
CNIPA, Second Office Action for CN Application No. 202210391855.6, Aug. 16, 2023.
CNIPA, Third Office Action for CN Application No. 202210391855.6, Nov. 1, 2023.

* cited by examiner

300

- 310: Send, by a network device, indication information to a terminal device, wherein the indication information is used to instruct the terminal device to determine a target group

- 320: Receive, by the network device, information for joining sent from the terminal device, wherein the information for joining is used to request to join the target group, and the information for joining includes identification information of the terminal device and attribute information of the target group

- 330: In response to the information for joining, send, by the network device, second feedback information to the terminal device

- 410: Send, by a first device, a request message to a network device, wherein the request message is used by a terminal device to determine a target group

FIG. 4

METHOD AND DEVICE FOR COMMUNICATION

CROSS-REFERENCE TO RELATED APPLICATION

This application is a continuation of International Application No. PCT/CN2018/103086, filed Aug. 29, 2018, the entire disclosure of which is incorporated herein by reference.

TECHNICAL FIELD

Embodiments of the present disclosure generally relate to communication technologies, and more particularly, to methods and devices for communication.

BACKGROUND

In recent years, with the rapid developments of mobile Internet and Internet of Things, the traffic of mobile users has exploded. User management becomes important for networks.

Therefore, how to achieve high-quality management by networks is an urgent problem to be solved.

SUMMARY

Embodiments of the present disclosure provide a communication method and device which can implement refined network management.

According to a first aspect, there is provided a communication method, including:
determining, by a terminal device, a target group: and
joining, by the terminal device, the target group to communicate with a network side.

According to a second aspect, there is provided a communication method, including:
sending, by a network device, indication information to a terminal device, wherein the indication information is used to instruct the terminal device to determine a target group:
receiving, by the network device, information for joining sent from the terminal device, wherein the information for joining is used to request to join the target group, and the information for joining includes identification information of the terminal device and attribute information of the target group: and
in response to the information for joining, sending, by the network device, second feedback information to the terminal device.

According to a third aspect, there is provided a communication method, including:
sending, by a first device, a request message to a network device, wherein the request message is used by a terminal device to determine a target group.

According to a fourth aspect, there is provided a terminal device configured to perform the method according to the first aspect or any implementation of the first aspect.

Specifically, the terminal device includes functional modules configured to perform the method according to the first aspect or any implementation of the first aspect.

According to a fifth aspect, there is provided a network device configured to perform the method according to the second aspect or any implementation of the second aspect.

Specifically, the network device includes functional modules configured to perform the method according to the second aspect or any implementation of the second aspect.

According to a sixth aspect, there is provided a communication device configured to perform the method according to the third aspect or any implementation of the third aspect.

Specifically, the communication device includes functional modules configured to perform the method according to the third aspect or any implementation of the third aspect.

According to a seventh aspect, there is provided a terminal device, including a processor and a memory. The memory is configured to store a computer program, and the processor is configured to call and run the computer program stored in the memory to perform the method according to the first aspect or any implementation of the first aspect.

According to an eighth aspect, there is provided a network device, including a processor and a memory. The memory is configured to store a computer program, and the processor is configured to call and run the computer program stored in the memory to perform the method according to the second aspect or any implementation of the second aspect.

According to a ninth aspect, there is provided a communication device, including a processor and a memory. The memory is configured to store a computer program, and the processor is configured to call and run the computer program stored in the memory to perform the method according to the third aspect or any implementation of the third aspect.

According to a tenth aspect, there is provided a chip configured to implement the method according to any one of the first to third aspects or any implementation of the third aspect to third aspects.

Specifically, the chip includes a processor configured to call and run a computer program stored in a memory to cause a device in which the chip is installed to perform the method according to any one of the first to third aspects or any implementation of the third aspect to third aspects.

According to an eleventh aspect, there is provided a computer-readable storage medium configured to store a computer program, wherein the computer program is configured to cause a computer to perform the method according to any one of the first to third aspects or any implementation of the third aspect to third aspects.

According to a twelfth aspect, there is provided a computer program product including computer program instructions that cause a computer to perform the method according to any one of the first to third aspects or any implementation of the third aspect to third aspects.

According to a thirteenth aspect, there is provided a computer program. When the computer program is run on a computer, the computer is caused to perform the method according to any one of the first to third aspects or any implementation of the third aspect to third aspects.

By using the above technical solutions, the terminal device can a target group from at least one group and joins the target group to communicate with a network side. In this way, the refined management by the network may be realized.

BRIEF DESCRIPTION OF THE DRAWINGS

FIG. 3 is a schematic flowchart of a communication method according to an embodiment of the present disclosure.

FIG. 4 is a schematic flowchart of a communication method according to an embodiment of the present disclosure.

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 1:
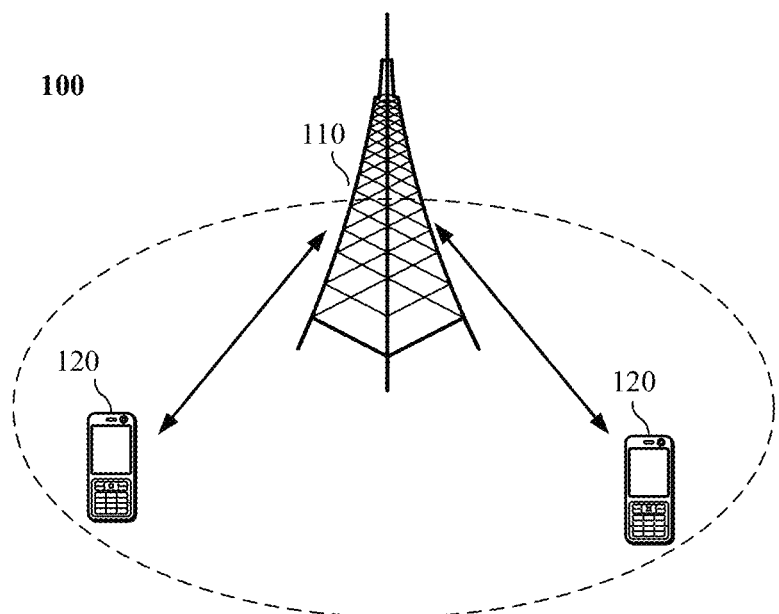
FIG. 1 is a schematic diagram of a communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections: and/or the terminal may be connected via another data connection/network: and/or the terminal device may be connected via a wireless interface, such as cellular networks, wireless local area network (WLAN), digital TV networks such as DVB-H networks, satellite networks, AM-FM A broadcast transmitter; and/or the terminal device is connected via a device of another terminal device which is configured to receive/send communication signals: and/or the terminal device is connected via an Internet of Things (IOT) device. A terminal device set as communicating through a wireless interface may be referred to as a "wireless communication terminal", a "wireless terminal" or a "mobile terminal". Examples of the mobile terminal include but are not limited to: satellite or cellular phone: Personal Communications System (PCS) terminal that can integrate a cellular radio phone with data processing, fax, and data communication capabilities: a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable devices, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein.

Figure 2:
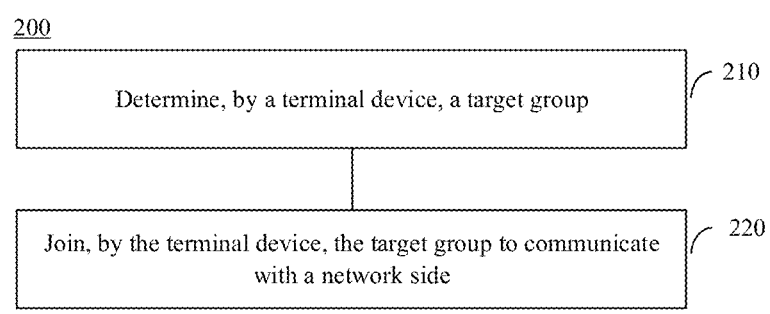
FIG. 2 is a schematic flowchart of a communication method according to an embodiment of the present disclosure.

FIG. 2 is a schematic flowchart of a communication method 200 according to an embodiment of the present disclosure. The method 200 may be performed by a terminal device, and may include at least part of the following contents.

In 210, the terminal device determines a target group.

In 220, the terminal device joins the target group to communicate with a network side.

FIG. 3 is a schematic flowchart of a communication method 300 according to an embodiment of the present disclosure. The method 300 may be performed by a network device, and may include at least part of the following contents.

In 310, the network device sends indication information to a terminal device. The indication information is used to instruct the terminal device to determine a target group.

In 320, the network device receives information for joining sent from the terminal device. The information for joining is used to request to join the target group, and the information for joining includes identification information of the terminal device and attribute information of the target group.

In 330, in response to the information for joining, the network device sends second feedback information to the terminal device.

FIG. 4 is a schematic flowchart of a communication method 400 according to an embodiment of the present disclosure. The method 400 may be performed by a first device, and may include at least part of the following contents.

In 410, the first device sends a request message to a network device.

The request message is used by a terminal device to determine a target group.

According to embodiments, the first device is a manager or a creator of a group in the network. The manager or creator of a group can be a terminal device or an external network device.

The communication methods of embodiments of the present disclosure will be further described below with reference to FIG. 2 to FIG. 4. It should be understood that the contents described below can be applied to the method 200, the method 300, and the method 400.

In embodiments of the present disclosure, the network device may be a functional entity for group management. The functional entity for group management may be a core network device or an access network device, which is not limited in embodiments of the present disclosure.

When the functional entity for group management is a core network device, according to embodiments, the functional entity for group management may be an existing core network entity. For example, the functional entity for group management may be Access and Mobility Management Function (AMF) which is responsible for access and mobility management, and has functions such as user authentication, handover, and location update. For another example, the functional entity for group management may be Session Management Function (SMF) which is responsible for session management, including the establishment, modification, and release of packet data unit (PDU) sessions.

According to embodiments, the functional entity for group management may be may also be an independent network element outside the core network.

In this case, the functional entity for group management and the terminal device may perform message transmission through the interface between the functional entity for group management and the terminal device, or messages may be forwarded by other network interface.

According to embodiments, one functional entity for group management can manage only one group, or can manage multiple groups. Alternatively, one functional entity for group management can manage all groups.

According to embodiments, the network in embodiments of the present disclosure may include an access network and/or a core network.

According to embodiments, the network type of the access network and/or the core network may be a local network and a public land network.

The public land network may be a public land network based on Public Land Mobile Network (PLMN).

A local network can also be called a local area network or a private network. The local network is usually deployed in office scenes, home scenes, or factories, and can realize more effective and safe management. Usually, local users or managers deploy local networks. Generally, users who are authorized to join have the right to join a local network.

The local networks can be managed or governed by a public land network. Alternatively, the local networks are not managed or governed by the public land network.

According to embodiments, the local network may use an unlicensed frequency band for communications, or may share a licensed frequency band with a public land network.

According to embodiments, the local network may be a network belonging to the category of 3GPP. The core network for the local network may be a core network in NR or LTE, and the local network may access the core network through an NR access network, an LTE access network or Wireless Fidelity (WiFi).

In embodiments of the present disclosure, a public land network and a local network may share a core network, and the access network is independent: or, a public land network and a local network may share an access network, and the core network is independent; or, a public land network and a local network may share an access network and a core network; or, a public land network and a local network do not share an access network and a core network.

In embodiments of the present disclosure, multiple groups or multiple types of groups may share a core network, and the access network is independent: or, multiple groups or multiple types of groups may share an access network, and the core network is independent; or, multiple groups or multiple types of groups may share an access network and a core network; or, multiple groups or multiple types of groups do not share an access network and a core network.

In embodiments of the present disclosure, a network may have one group or multiple groups.

According to embodiments, one group may have one core network or one access network.

According to embodiments, the access network for two different groups may be the same, and the core networks for two different groups may be different.

According to embodiments, the core network for two different groups may be the same, and the access networks for two different groups may be different.

According to embodiments, the core networks and access networks for two different groups may be different.

In embodiments of the present disclosure, the terminal device may determine the target group from at least one group in the network using one of the following methods:

Method 1: The terminal device determines the target group from at least one group according to attribute information of the at least one group.

The attribute information includes at least one of the following information: group identification information, group size information, external network server information of the at least one group, network slice information of the at least one group, Quality of Service (QoS) information of the at least one group, frequency band information of the at least one group, security level information of the at least one group, and current capacity information of the at least one group.

According to embodiments, the group identification information may also be referred to as the group name information or other names, which are not specifically limited in embodiments of the present disclosure.

According to embodiments, the group identification information can be pre-configured on the terminal device.

According to embodiments, the group size can be understood as the maximum number of group members that can be accommodated. The larger the maximum number of group members that can be accommodated is, the larger the group size will be: the smaller the maximum number of group members that can accommodate is, the smaller the group size will be.

According to embodiments, the network slice of a group may include the network slice for Enhanced Mobile Broadband (EMBB), the network slice for Ultra Reliable and Low Latency Communications (URLLC), or the network slice for Massive Machine Type Communications, mMTC) etc.

According to embodiments, the external network server information of a group may also be referred to as the external server information of the group.

According to embodiments, the QoS information of a group may include, but is not limited to, delay information of the group, bandwidth information of the group, and reliability information of the group.

According to embodiments, the current capacity of a group can be understood as the current number of members of the group, or the number of members that the group can further accommodate.

For example, if the network device broadcasts three groups to the terminal device, and the security levels of the three groups are different, the terminal device may determine the group with the highest security level as the target group.

For another example, the terminal device needs to perform service transmission, and the service is a network slice for EMBB. The network has two groups, the network slice of one group is the network slice for EMBB, and the network slice of the other group is the network slice for URLLC. The terminal device can determine the group whose network slice is EMBB as the target group.

For another example, the network broadcasts three groups, namely, group 1, group 2, and group 3. The delay of group 1 and the delay of group 2 are the same, and both delays of the two groups are 1 ms. The delay of group 3 is 2 ms. The terminal device may first select groups with low delays, i.e., group 1 and group 2, and then select group 1 as the target group based on the groups' identification information.

It should be understood that the term "and/or" describes an association relationship between associated objects, which means that there can be three relationships, for example, A and/or B can mean that A exists only, both A and B exist, and B exists only.

Method 2: The network device may send indication information to the terminal device, and the indication information is used to indicate the target group. Correspondingly, after receiving the indication information, the terminal device can determine the target group.

In embodiments of the present disclosure, the terminal device may determine the target group from at least one group.

In embodiments of the present disclosure, the at least one group may refer to at least one group that the terminal device belongs to, at least one group supported by the network device, at least one group that the terminal device expects to join, and/or at least one group that the first device expects the terminal device to join.

According to embodiments, the at least one group that the terminal device belongs to may indicate that the terminal device is a member of this group and belongs to this group. A terminal device belonging to a group means that the terminal device cannot communicate with the network side.

According to embodiments, the terminal device joining the target group means that the terminal device can communicate with the network side.

According to embodiments, the indication information indicating the target group may be understood as: the indication information indicates the target group explicitly.

As an example, after determining the target group, the network device sends indication information to the terminal device, and the indication information includes identification information of the target group.

According to embodiments, the indication information indicating the target group can be understood as: the indication information indicates the target group implicitly.

As an example, the network device may determine the group that the terminal device belongs to, the group supported by the network device, the group that the terminal device expects to join, and/or the group that the first device expects the terminal device to join. Then, the network device may send indication information to the terminal device, and the indication information may include identification information of the group that the terminal device belongs to, the group supported by the network device, the group that the terminal device expects to join, and/or the group that the first device expects the terminal device to join.

In an implementation, when at least one group is at least one group that the terminal device belongs to, the terminal device may become a member of the group by a pre-configuration method and/or a network configuration method.

As an example, the terminal device becoming a member of the group by a pre-configuration method may include: the terminal device becoming a member of the group by subscription.

In other words, the subscription information of the terminal device corresponds to the group that the terminal device belongs to.

According to embodiments, the correspondence between the subscription information of the terminal device and the group that the terminal device belongs to may be a one-to-one correspondence. That is, one piece of subscription information of the terminal device may correspond to one group that the terminal device belongs to. In this case, the group that the terminal device belongs to is one group.

According to embodiments, the correspondence between the subscription information of the terminal device and the groups that the terminal device belongs to may be a one-to-many relationship. That is, one piece of subscription information of the terminal device may correspond to multiple groups. In this case, there are multiple groups that the terminal device belongs to.

As another example, the terminal device becomes a member of a group that the terminal device belongs to through network configuration, which can include the following three cases:

Case 1: The terminal device sends request information to the network device, and the request information includes identification of the terminal device. After receiving the request information, the network device can determine which group the terminal device belongs to according to the identification of the terminal device, and the network device can configure the terminal device as a member of the group.

Case 2: The terminal device sends a first request message to the network device, and the first request message carries attribute information of the group requested by the terminal device. The network device can configure the terminal device as a member of the group that the terminal device belongs to using at least one of the subscription information of the terminal device, the configuration information when the group requested by the terminal device is created, and the groups supported by the network device.

Case 3: The terminal device determines the groups supported by the network device, and then sends a first request message to the network device based on the groups supported by the network device. The network device can configure the terminal device as a member of the group that the terminal device belongs to according to the subscription information of the terminal device and/or the configuration information when the group requested by the terminal device is created.

According to embodiments, the terminal device may determine the groups supported by the network device by determining the attribute information of the groups supported by the network device.

According to embodiments, the terminal device may determine the groups supported by the network according to second configuration information. The second configuration information may include attribute information of the groups supported by the network device.

The second configuration information may be pre-configured on the terminal device, or may be sent from the network device to the terminal device.

After the network device configures one or more groups that the terminal device belongs to for the terminal device, the network device may send first configuration information to the terminal device, and the first configuration information may include attribute information of the one or more groups that the terminal device belongs to.

After receiving the first configuration information, the terminal device may determine the one or more groups that the terminal device belongs to based on the attribute information of the one or more groups that the terminal device belongs to. After determining the one or more groups that the terminal device belongs to, the terminal device can determine the target group from the one or more groups that the terminal device belongs to.

According to embodiments, the terminal device determining the target group from the one or more groups that the terminal device belongs to may include:

the terminal device selecting the target group arbitrarily; or the terminal device determining the target group according to the identification information and/or attribute information of the one or more groups that the terminal device belongs to; or the terminal device obtaining the service volume of the one or more groups that the terminal device belongs to, and determining the group that the terminal device belongs to with the least service volume or the service volume below a threshold as the target group; or the network device sending third configuration information to the terminal device, wherein the third configuration information includes attribute information of the target group; after receiving the third configuration information, the terminal device determining the target group from the one or more groups that the terminal device belongs to based on the attribute information of the target group.

In another implementation, when at least one group belongs to at least one group supported by the network device, the terminal device may determine the at least one group supported by the network device according to second configuration information. Then, the terminal device can determine the target group from the at least one group supported by the network.

It should be understood that for the determination of the target group performed by the terminal device from the at least one group supported by the network, the previous description regarding the determination of the target group performed by the terminal device from one or more groups that the terminal device belongs to may be referred to. For the sake of brevity, details are not described here.

In another implementation, when at least one group belongs to at least one existing group, the terminal device may first determine the at least one existing group, and then determine the target group from the at least one existing group.

According to embodiments, an existing group can be understood as a group currently existing in the network.

Determining the existing group by the terminal may include the following steps. The network device sends first information to the terminal device, and the first information includes attribute information of at least one existing group. After receiving the first information, the terminal device may determine the at least one existing group based on the attribute information of the at least one existing group.

According to embodiments, the first information may also include information about members of the at least one group, such as identification information or address information of the members.

Specifically, as an example, the terminal device may send a second request message to the network device, and the second request message may be used to request the network device to provide the at least one existing group. After receiving the second request message, the network device determines whether to provide the at least one existing group to the terminal device. If the network device determines to provide the at least one existing group to the terminal device, the network device may send the first information to the terminal device.

According to embodiments, determining, by the network device, whether to provide at least one existing group to the terminal device may include:

determining, by the network device, whether the terminal device has a right to query group information: or determining, by the network device, whether the current number of members of the at least one existing group has reached the maximum value: or determining, by the network device, whether there is currently an existing group.

If the terminal device has the right to query group information, or the current number of members of at least one existing group has not reached the maximum value, or there is currently an existing group, the network device determines that the at least one existing group can be provided to the terminal device.

On the contrary, the network device refuses to provide the at least one existing group to the terminal device and sends fourth information to the terminal device. The fourth information may include the reason why the network device refuses to provide the at least one existing group to the terminal device, for example, the reason is that the terminal device has no right to query group information.

As another example, the terminal device may send a third request message to the network device, and the third request message includes attribute information of a group that the terminal device requests the network device to provide. After receiving the third request message, the network device determines whether to provide the at least one existing group to the terminal device. If the network device determines to provide the at least one existing group to the terminal device, the network device may send the first information to the terminal device.

According to embodiments, the first information may also indicate whether the group requested by the terminal device exists.

As another example, the network device may voluntarily send the first information to the terminal device.

According to embodiments, the network device may continuously send the first information to the terminal device, or may send the first information to the terminal device according to a preset period. For example, the network device may send the first information to the terminal device every 3 ms.

According to embodiments, the network device may send the first information to the terminal device in the form of broadcast.

According to embodiments, in the process of terminal device registration or session establishment, the network device may provide the terminal device with information about the group that the terminal device belongs to according to the subscription information of the terminal device, for example, whether the group that the terminal device belongs to exists, the attribute information of the group, etc.

After the terminal device determines the at least one existing group, terminal device can determine the target group from the at least one existing group.

It should be understood that for the determination of the target group performed by the terminal device from the at least one existing group, the previous description regarding the determination of the target group performed by the terminal device from one or more groups that the terminal device belongs to may be referred to. For the sake of brevity, details are not described here.

Figure 5:
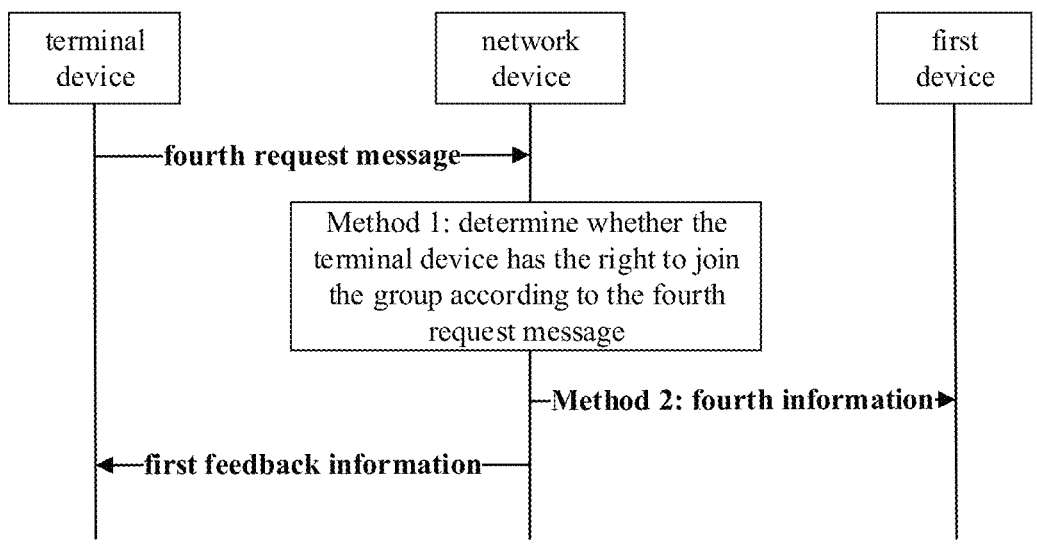
FIG. 5 is a schematic diagram showing determination of a target group by a terminal device according to an embodiment of the present disclosure.

In another implementation, when at least one group belongs to at least one group that the terminal device expects to join, as shown in FIG. 5, the terminal device may send a fourth request message to the network device, and the fourth request message carries attribute information of the at least one group that the terminal device expects to join.

After receiving the fourth request message, the network device can determine the target group from the at least one group that the terminal device expects to join.

As an example, the network device may determine the target according to at least one of the subscription information of the terminal device, the configuration information when the at least one group that the terminal device expects to join is created, and the identification information and/or attribute information of the at least one group that the terminal device expects to join.

According to embodiments, the network device may determine at least one group that the terminal device belongs to according to the subscription information of the terminal device and/or the configuration information when the at least one group that the terminal device expects to join is created. Then, the network device may determine the at least one group that the terminal device belongs to as the target group.

In other words, the network device can determine whether the terminal device is a member of a certain group, and if terminal device is a member of a certain group, the network device can determine the group as the target group.

For example, the groups that the terminal device expects to join include group 1, group 2, and group 3. If the terminal device is a member of group 2 and group 3, the network device may determine group 2 and group 3 as the target groups.

As another example, the network device may determine, among the at least one group that the terminal device expects to join, at least one group supported by the network device as the target group.

For example, the groups that the terminal device expects to join include group 1, group 2, and group 3, the groups supported by the network device are group 1 and group 4, and the network device may determine group 1 as the target group.

As another example, the network device may send fourth information to the first device, and the fourth information includes attribute information of at least one group that the terminal device expects to join. After receiving the fourth information, the first device may determine the target group based on the attribute information.

After the first device determines the target group, first device may send third feedback information to the network device, and the third feedback information may include attribute information of the target group.

It should be noted that in embodiments of the present disclosure, the first device may determine the target group in the same manner as the network device, which is not repeated here.

Then, the network device may send first feedback information to the terminal device, and the first feedback information includes the attribute information of the target group. After the terminal device receives the first feedback information, the terminal device may determine the target group based on the attribute information of the target group.

In another implementation, when at least one group belongs to at least one group that the first device expects the terminal device to join, the first device may send a sixth request message to the network device, and the sixth request message carries identification information or address information of the terminal device, attribute information of the at least one group that the first device expects the terminal device to join, and identification information or address information of the first device.

After receiving the sixth request message, the network device can determine whether the first device has the right to request the terminal device to join the at least one group that the first device expects the terminal device to join.

According to embodiments, determining the first device has the right to request the terminal device to join the at least one group that the first device expects the terminal device to join may include: determining whether the first device is the manager or creator of the at least one group.

If the first device has the right to request the terminal device to join the at least one group that the first device expects the terminal device to join, the first device may request the terminal device to join the at least one group that the first device expects the terminal device to join.

Otherwise, the first device cannot request the terminal device to join the at least one group that the first device expects the terminal device to join.

If the first device can request the terminal device to join the at least one group that the first device expects the terminal device to join, the network device can send second information to the terminal device. The second information includes attribute information of the at least one group that the first device expects the terminal device to join.

According to embodiments, the second information may f include identification information or address information of the first device.

After receiving the second information, the terminal device may determine the at least one group that the first device expects the terminal device to join based on the attribute information of the at least one group. Then, the terminal device may determine the target group from the at least one group that the first device expects the terminal device to join.

According to embodiments, after determining the target group, the terminal device may send response information to the network device, and the response information may include attribute information of the target group. After receiving the response information, the network device may send the response information to the first device.

According to embodiments, the method may further include: if the terminal device does not accept the request of the first device, refusing, by the terminal device, to join the at least one group that the first device expects the terminal device to join.

In embodiments of the present disclosure, the terminal device may join the target group after or while determining the target group.

Specifically, as an example, the terminal device may send information for joining to the network device, and the information for joining may be used to request to join the target group. After receiving the information for joining, the network device may send second feedback information to the terminal device. After receiving the second feedback information, the terminal device can join the target group.

According to embodiments, the information for joining may include identification information of the terminal device and attribute information of the target group.

As another example, the terminal device may establish a session connection based on the target group.

According to embodiments, the terminal device may request establishment of a session connection, or the network device may instruct the terminal device to establish a session connection. And, the network device may send the address information of the session connection to the terminal device. After receiving the address information of the session connection, the terminal device can establish the session connection.

Embodiments of the present disclosure may further include: sending, by the network device, third information to the terminal device. The third information includes attribute information of the target group from which the terminal device is to leave.

Figure 6:
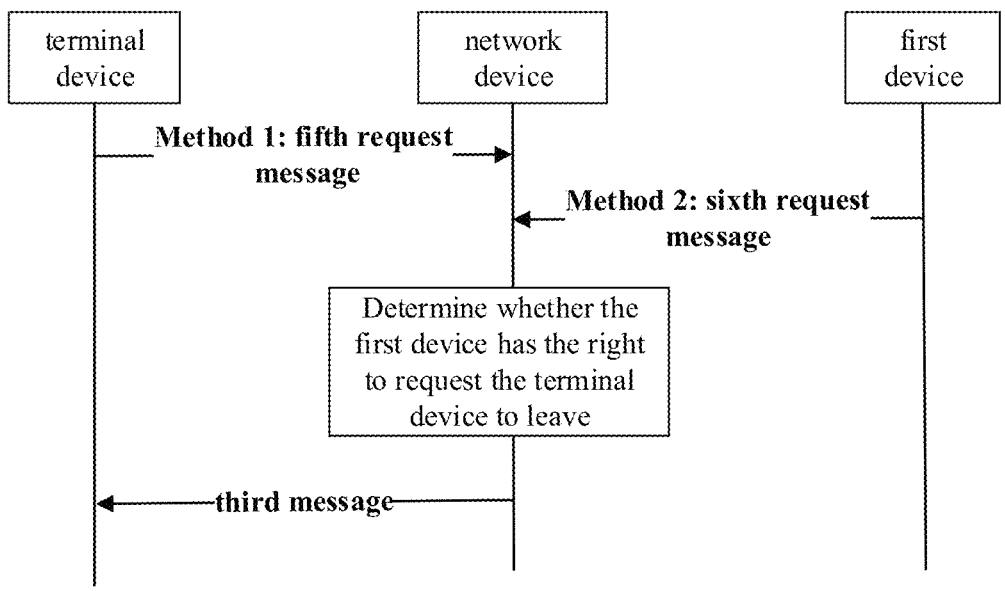
FIG. 6 is a schematic diagram showing leaving from a target group by a terminal device according to an embodiment of the present disclosure.

As shown in FIG. 6, the terminal device can voluntarily request to leave the target group, or the first device can request the terminal device to leave the target group.

As an example, if the terminal device voluntarily requests to leave the target group, specifically, the terminal device may send a fifth request message to the network device, and the fifth request message carries identification information of the target group that the terminal device requests to leave.

After receiving the fifth request message, the network device can determine whether the terminal device can leave the target group. According to embodiments, the network device may determine whether the terminal device has the right to leave the target group, or whether the network device allows the terminal device to leave the target group.

If the terminal device can leave the target group, the network device sends the third information to the terminal device.

As another example, if the first device requests the terminal device to leave the target group, specifically, the first device may send a sixth request message to the network device. The sixth request message may carry the identification information of the terminal device and the attribute information of the target group that the first device requests the terminal to leave.

After receiving the sixth request message, the network device determines whether the first device can request the terminal device to leave the target group. According to embodiments, determining whether the first device can request the terminal device to leave the target group may include: determining whether the first device has the right to request the terminal device to leave the target group, or whether the first device is the creator or manager of the group.

If the first device can request the terminal device to leave the target group, the network device sends the third information to the terminal device. After receiving the third information, the terminal device can determine whether to leave the target group.

According to embodiments, the method may further include: if the terminal device does not leave the target group, sending, by the terminal device, second feedback information to the network device. The second feedback information may include attribute information of the target group that the terminal device does not leave.

According to embodiments, if the terminal device is currently communicating with the network side in the target group, the terminal device may not leave the target group.

In embodiments of the present disclosure, the terminal device may be divided into at least one group, and the terminal device may determine the target group from the at least one group and join the target group. In this way, refined management by the network may be realized.

It should be understood that, in various embodiments of the present disclosure, the sequence number of the above-mentioned processes does not mean the order of execution, and the execution order of each process should be determined by its function and internal logic, and the sequence number of the above-mentioned processes should not be construed as constituting any limitation on implementations of the present disclosure.

The communication method according to embodiments of the present disclosure is described in detail above. The communication device according to embodiments of the present disclosure will be described below with reference to FIG. 6 to FIG. 8. The technical features described in the method embodiments are applicable to the following device embodiments.

Figure 7:
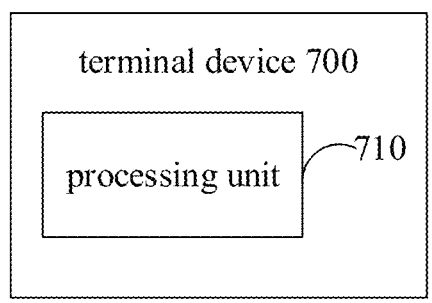
FIG. 7 is a schematic block diagram of a terminal device according to an embodiment of the present disclosure.

FIG. 7 is a schematic block diagram of a terminal device 700 according to an embodiment of the present disclosure. As shown in FIG. 7, the terminal device 700 includes a processing unit 710.

The processing unit 710 is configured to determine a target group.

The processing unit 710 is further configured to join the target group to communicate with a network side.

In embodiments of the present disclosure, the processing unit 710 is configured to:
determine the target group from at least one group according to attribute information of the at least one group.

In embodiments of the present disclosure, the attribute information includes at least one of the following information:
group identification information, group size information, external network server information of the at least one group, network slice information of the at least one group, QoS information of the at least one group, frequency band information of the at least one group, security level information of the at least one group, and current capacity information of the at least one group.

In embodiments of the present disclosure, the terminal device 700 further includes a communication 720.

The communication unit 720 is configured to receive indication information sent by a network device. The indication information is used to indicate the target group.

In embodiments of the present disclosure, the processing unit 710 is configured to:
determine at least one group which the terminal device 700 belongs to; and
determine the target group from the at least one group which the terminal device belongs to.

In embodiments of the present disclosure, the terminal device 700 further includes a communication 720.

The communication unit 720 is configured to send a first request message to a network device. The first request message carries attribute information of at least one group requested by the terminal device.

The communication unit 720 is further configured to receive first configuration information sent by the network device. The first configuration information includes attribute information of the at least one group that the terminal device belongs to.

The processing unit 710 is configured to determine the at least one group that the terminal device belongs to based on the attribute information of the at least one group that the terminal device belongs to.

In embodiments of the present disclosure, the terminal device 700 further includes a communication unit 720.

The communication unit 720 is configured to receive first information sent by a network device. The first information includes attribute information of at least one existing group.

The processing unit 710 is configured to:
determine the at least one existing group based on the attribute information of the existing group: and
determine the target group from the at least one existing group.

In embodiments of the present disclosure, the communication unit 720 is further configured to:
send a second request message to the network device, wherein the second request message is used to request the network device to provide the at least one existing group.

In embodiments of the present disclosure, the communication unit 720 is further configured to:
send a third request message to the network device: wherein the third request message includes attribute information of a group that the terminal device 700 requests the network device to provide.

In embodiments of the present disclosure, the terminal device 700 further includes a communication unit 720.

The communication unit 720 is configured to send a fourth request message to a network device The fourth request message carries attribute information of at least one group that the terminal device expects to join.

The communication unit 720 is further configured to receive first feedback information sent by the network device. The first feedback information includes attribute information of the target group.

The processing unit 710 is further configured to determine the target group based on the attribute information of the target group.

In embodiments of the present disclosure, the terminal device 700 further includes a communication unit 720.

The communication unit 720 is configured to receive second information sent by a network device. The second information includes attribute information of at least one group that a first device expects the terminal device to join.

The processing unit 710 is configured to:
determine the at least one group that the first device expects the terminal device 700 to join based on the attribute information of the group that the first device expects the terminal device 700 to join; and
determine the target group from the at least one group that the first device expects the terminal device 700 to join.

In embodiments of the present disclosure, the communication unit 720 is further configured to:
send response information to the network device, wherein the response information includes identification information of the target group.

In embodiments of the present disclosure, the first device is a manager or creator of a group.

In embodiments of the present disclosure, the processing unit 710 is configured to:
determine at least one group supported by a network device according to second configuration information, wherein the second configuration information is sent from the network device to the terminal device 700, or the configuration information is pre-configured on the terminal device 700; and
determine the target group from the at least one group supported by the network device.

In embodiments of the present disclosure, the terminal device 700 further includes a communication unit 720.

The communication unit 720 is configured to send information for joining to a network device. The information for joining is used to request joining the target group, and the information for joining includes identification information of the terminal device 700 and attribute information of the target group.

The communication unit 720 is further configured to receive second feedback information sent from the network device in response to the information for joining.

In embodiments of the present disclosure, the processing unit 710 is configured to:
establish a session connection based on the target group.

In embodiments of the present disclosure, the terminal device 700 further includes a communication unit 720.

The communication unit 720 is configured to receive third information sent from a network device. The third information includes attribute information of the target group from which the terminal device is to leave.

The processing unit 710 is further configured to determine whether to leave the target group based on the attribute information of the target group.

In embodiments of the present disclosure, the communication unit 720 is further configured to:
send a fifth request message to the network device, wherein the fifth request message carries identification information of the target group that the terminal device 700 requests to leave.

In embodiments of the present disclosure, the communication unit 720 is further configured to:
if the terminal device 700 does not leave the target group, send second feedback information to the network device, wherein the second feedback information includes attribute information of the target group that the terminal device 700 does not leave.

In embodiments of the present disclosure, the network device is a core network device or an access network device.

In embodiments of the present disclosure, a message between the terminal device 700 and the network device is transmitted through an interface between the terminal device 700 and the network device, or the message between the terminal device 700 and the network device is forwarded through another network interface.

It should be understood that the terminal device 700 may correspond to the terminal device in the method 200, and can be configured to implement the corresponding operations of the terminal device in the method 200. For brevity, details are not repeated herein again.

Figure 8:
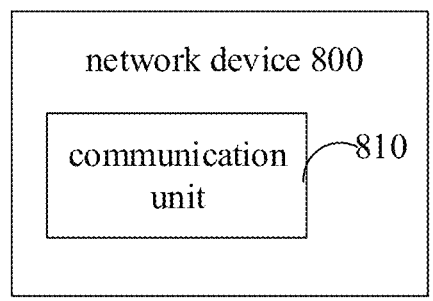
FIG. 8 is a schematic block diagram of a network device according to an embodiment of the present disclosure.

FIG. 8 is a schematic block diagram of a network device 800 according to an embodiment of the present disclosure. As shown in FIG. 8, the network device 800 includes a communication unit 810.

The communication unit 810 is configured to send indication information to a terminal device. The indication information is used to instruct the terminal device to determine a target group.

The communication unit 810 is further configured to receive information for joining sent from the terminal device. The information for joining is used to request to join the target group, and the information for joining includes identification information of the terminal device and attribute information of the target group.

The communication unit 810 is further configured to, in response to the information for joining, send second feedback information to the terminal device.

In embodiments of the present disclosure, the communication unit 810 is configured to:
receive a first request message sent from the terminal device, wherein the first request message carries attribute information of at least one group requested by the terminal device.

The network device 800 further includes:
a processing unit 820 configured to determine a group which the terminal device belongs to from the at least one group requested by the terminal device, according to subscription information of the terminal device and/ or groups supported by the network device 800.

The communication unit 810 is configured to send the indication information to the terminal device. The indication information includes identification information of the group that the terminal device belongs to.

In embodiments of the present disclosure, the attribute information includes at least one of the following information:

group identification information, group size information, external network server information of the at least one group, network slice information of the at least one group, QoS information of the at least one group, frequency band information of the at least one group, security level information of the at least one group, and current capacity information of the at least one group.

In embodiments of the present disclosure, the communication unit 810 is configured to:
send the indication information to the terminal device, wherein the indication information includes identification information of at least one existing group.

In embodiments of the present disclosure, the network device 800 further includes:
a processing unit 820 configured to verify whether to provide the attribute information of the at least one existing group to the terminal device.

The communication unit 810 is configured to:
if the network device determines to provide the attribute information of the at least one existing group to the terminal device, send the indication information to the terminal device.

In embodiments of the present disclosure, the processing unit 820 is configured to:
verify whether the terminal device has a right to query the attribute information of the at least one group.

In embodiments of the present disclosure, the communication unit 810 is further configured to:
receive a second request message sent from the terminal device, wherein the second request message is used to request the network device 800 to provide the at least one existing group.

In embodiments of the present disclosure, the communication unit 810 is further configured to:
receive a third request message sent from the terminal device, wherein the third request message includes attribute information of a group that the terminal device requests the network device 800 to provide.

In embodiments of the present disclosure, the indication information is further used to indicate whether the group that the terminal device requests the network device 800 to provide exists.

In embodiments of the present disclosure, the communication unit 810 is further configured to:
if the network device 800 refuses to provide attribute information of the at least one existing group, send fourth information to the terminal device, wherein the fourth information includes a reason why the network device 800 refuses to provide the attribute information of the at least one existing group to the terminal device.

In embodiments of the present disclosure, the communication unit 810 is configured to:
receive a fourth request message sent from the terminal device, wherein the fourth request message carries attribute information of at least one group that the terminal device expects to join.

The network device 800 further includes:
a processing unit 820 configured to determine the target group from the at least one group that the terminal device expects to join.

The communication unit 810 is configured to: send the indication information to the terminal device, wherein the indication information includes attribute information of the target group.

In embodiments of the present disclosure, the processing unit 820 is configured to:
  determine the target group, according to at least one of subscription information of the terminal device, configuration information of the at least one group that the terminal device expects to join, and the attribute information of the at least one group that the terminal device expects to join.

In embodiments of the present disclosure, the communication unit 810 is configured to:
  send fourth information to a first device, wherein the fourth information includes attribute information of the at least one group that the terminal device expects to join, and the first device is a manager or a creator of a group: and
  receive third feedback information sent from the first device in response to the fourth information, wherein the third feedback information includes attribute information of the target group.

In embodiments of the present disclosure, the communication unit 810 is configured to:
  receive a sixth request message sent from a first device, wherein the sixth request message carries attribute information of the terminal device, attribute information of at least one group that the first device expects the terminal device to join, and attribute information of the first device, and the first device is a manager or a creator of the at least one group.

The network device 800 further includes:
  a processing unit configured to verify whether the first device has a right to request the terminal device to join the at least one group that the first device expects the terminal device to join.

The communication unit 810 is configured to, if the first device has the right, send the indication information to the terminal device, wherein the indication information includes the attribute information of the at least one group that the first device expects the terminal device to join.

In embodiments of the present disclosure, the communication unit 810 is further configured to:
  receive response information sent from the terminal device, wherein the response information includes the attribute information of the target group: and send the response information to the first device.

In embodiments of the present disclosure, the communication unit 810 is configured to:
  send the indication information to the terminal device, wherein the indication information includes at least one group supported by the network device.

In embodiments of the present disclosure, the communication unit 810 is further configured to:
  send third information to the terminal device, wherein the third information includes attribute information of the target group from which the terminal device is to leave.

In embodiments of the present disclosure, the communication unit 810 is configured to:
  receive a fifth request message sent from the terminal device, wherein the fifth request message carries the attribute information of the target group that the terminal device requests to leave.

In embodiments of the present disclosure, the communication unit 810 is configured to:
  receive a sixth request message sent from a first device, wherein the sixth request message carries attribute information of the terminal device and attribute information of the target group that the first device requests the terminal device to leave.

The network device further includes:
  a processing unit 820 configured to verify whether the first device has a right to request the terminal device to leave the target group.

The communication unit is configured to, if the first device has the right, send the third information to the terminal device.

In embodiments of the present disclosure, the communication unit 810 is further configured to:
  if the terminal device does not leave the target group, receive second feedback information sent from the terminal device, wherein the second feedback information includes the attribute information of the target group that the terminal device does not leave.

In embodiments of the present disclosure, the network device is a core network device or an access network device.

In embodiments of the present disclosure, a message between the network device 800 and the terminal device is transmitted through an interface between the network device 800 and the terminal device, or the message between the network device 800 and the terminal device is forwarded through another network interface.

Figure 9:
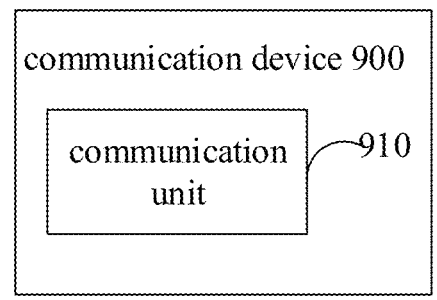
FIG. 9 is a schematic block diagram of a communication device according to an embodiment of the present disclosure.

It should be understood that the network device 800 may correspond to the network device in the method 300, and can be configured to implement the corresponding operations of the network device in the method 300. For brevity, details are not repeated herein again FIG. 9 is a schematic block diagram of a communication device 900 according to an embodiment of the present disclosure. As shown in FIG. 9, the communication device 900 includes a communication unit 910.

The communication unit 910 is configured to send a request message to a network device, wherein the request message is used by a terminal device to determine a target group.

In embodiments of the present disclosure, the communication unit 910 is configured to:
  send the request message to the network device, wherein the request message carries attribute information of the terminal device, identification information of at least one group that the communication device 900 expects the terminal device to join, and attribute information of the communication device 900.

In embodiments of the present disclosure, the communication unit is further configured to:
  receive response information sent from the network device, wherein the response information includes attribute information of the target group.

In embodiments of the present disclosure, the communication unit 910 is configured to:
  receive from the network device attribute information of at least one group that the terminal device expects to join.

The communication device 900 further includes: a processing unit 920 configured to determine the target group based on the attribute information.

The communication unit 910 is further configured to send the request message to the network device, wherein the request message carries identification information of the target group.

In embodiments of the present disclosure, the communication unit 910 is further configured to:
  send a leaving message to the network device, wherein the leaving message carries attribute information of the terminal device and attribute information of the target group that the first device requests the terminal device to leave.

In embodiments of the present disclosure, the attribute information includes at least one of the following information:

group identification information, group size information, external network server information of the at least one group, network slice information of the at least one group, Quality of Service (QOS) information of the at least one group, frequency band information of the at least one group, security level information of the at least one group, and current capacity information of the at least one group.

In embodiments of the present disclosure, the first device is a manager or a creator of a group, and the communication device 900 is a terminal device or a network device.

In embodiments of the present disclosure, the network device is a core network device or an access network device.

In embodiments of the present disclosure, a message between the terminal device and the network device is transmitted through an interface between the terminal device and the network device, or the message between the terminal device and the network device is forwarded through another network interface.

It should be understood that the communication device 900 may correspond to the first device in the method 400, and can be configured to implement the corresponding operations of the first device in the method 400. For brevity, details are not repeated herein again.

Figure 10:
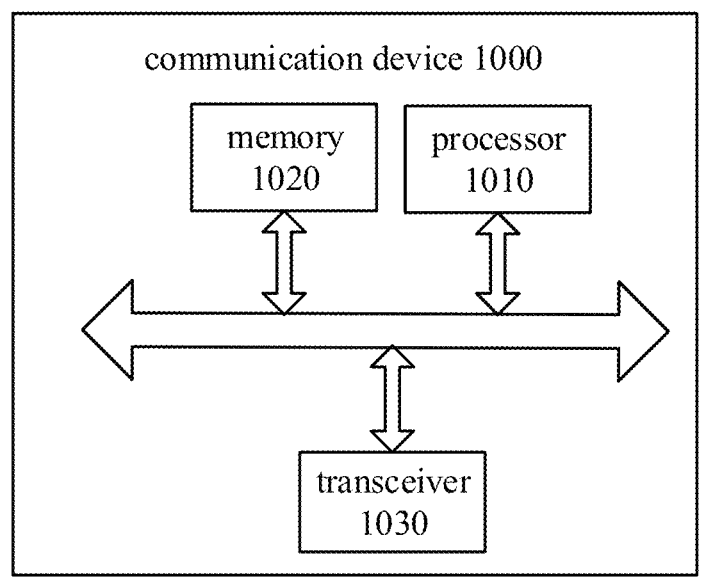
FIG. 10 is a schematic block diagram of a communication device according to an embodiment of the present disclosure.

FIG. 10 is a schematic structural diagram of a communication device 1000 according to an embodiment of the present disclosure. The communication device 1000 shown in FIG. 10 includes a processor 1010, and the processor 1010 may call and run a computer program from a memory to perform the method in embodiments of the present disclosure.

According to embodiments, as shown in FIG. 10, the communication device 1000 may further include a memory 1020. The processor 1010 may call and run a computer program from the memory 1020 to perform the method in embodiments of the present disclosure.

The memory 1020 may be a separate device independent of the processor 1010, or may be integrated in the processor 1010.

According to embodiments, as shown in FIG. 10, the communication device 1000 may further include a transceiver 1030, and the processor 1010 may control the transceiver 1030 to communicate with other devices. Specifically, the transceiver may send information or data to other devices, or receive information or data sent by other devices.

The transceiver 1030 may include a transmitter and a receiver. The transceiver 1030 may further include one or more antennas.

According to embodiments, the communication device 1000 may specifically be the terminal device in embodiments of the present disclosure, and the communication device 1000 may implement the corresponding processes implemented by the terminal device in the method embodiments of the present disclosure. For brevity, details are not repeated here.

According to embodiments, the communication device 1000 may specifically be the network device according to an embodiment of the present disclosure, and the communication device 1000 may implement the corresponding processes implemented by the network device in the method embodiments of the present disclosure. For brevity, details are not repeated here.

According to embodiments, the communication device 1000 may specifically be the first device according to an embodiment of the present disclosure, and the communication device 1000 may implement the corresponding processes implemented by the first device in the method embodiments of the present disclosure. For brevity, details are not repeated here.

Figure 11:
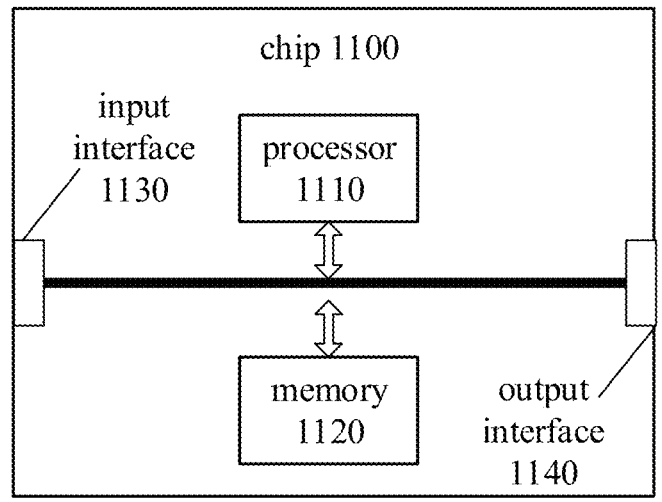
FIG. 11 is a schematic block diagram of a chip according to an embodiment of the present disclosure.

FIG. 11 is a schematic structural diagram of a chip according to an embodiment of the present disclosure. The chip 1100 shown in FIG. 11 includes a processor 1110, and the processor 1110 can call and run a computer program from a memory to implement the method according to embodiments of the present disclosure.

According to embodiments, as shown in FIG. 11, the chip 1100 may further include a memory 1120. The processor 1110 may call and run a computer program from the memory 1120 to implement the method according to embodiments of the present disclosure.

The memory 1120 may be a separate device independent of the processor 1110, or may be integrated in the processor 1110.

According to embodiments, the chip 1100 may further include an input interface 1130. The processor 1110 may control the input interface 1130 to communicate with other devices or chips, and specifically, the processor 1110 can control the input interface to obtain information or data sent by other devices or chips.

According to embodiments, the chip 1100 may further include an output interface 1140. The processor 1110 can control the output interface 1140 to communicate with other devices or chips, and specifically, the processor 1110 can control the output interface 1140 to output information or data to other devices or chips.

According to embodiments, the chip can be applied to the terminal device in embodiments of the present disclosure, and the chip can implement the corresponding processes implemented by the terminal device in various methods according to embodiments of the present disclosure. For brevity, details are not repeated herein again.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the first device in embodiments of the present disclosure, and the chip can implement the corresponding processes implemented by the first device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

Figure 12:
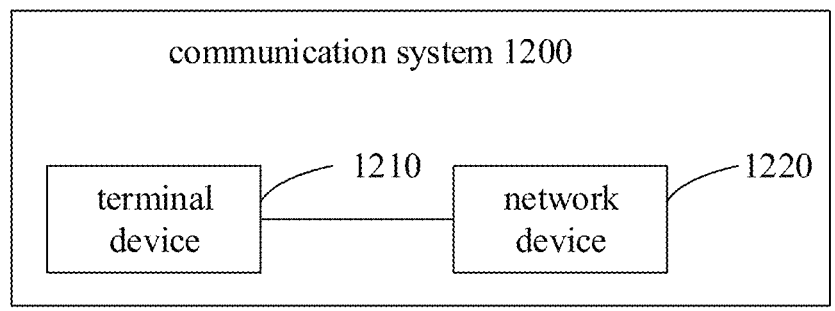
FIG. 12 is a schematic block diagram of a communication system according to an embodiment of the present disclosure.

FIG. 12 is a schematic block diagram of a communication system 1200 according to an embodiment of the present disclosure. As shown in FIG. 12, the communication system 1200 includes a terminal device 1210 and a network device 1220.

The terminal device 1210 may be used to implement the corresponding functions implemented by the terminal device in the foregoing methods, and the network device 1220 may be used to implement the corresponding functions implemented by the network device in the foregoing methods. For brevity, details are not repeated herein again.

Figure 13:
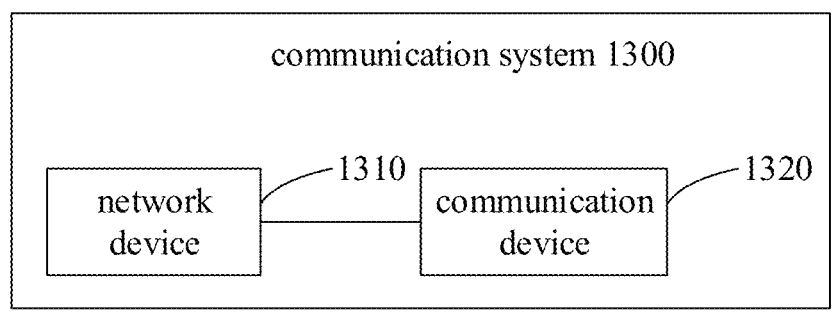
FIG. 13 is a schematic block diagram of a communication system according to an embodiment of the present disclosure.

FIG. 13 is a schematic block diagram of a communication system 1300 according to an embodiment of the present disclosure. As shown in FIG. 13, the communication system 1300 includes a network device 1310 and a communication device 1320.

The network device 1310 may be used to implement the corresponding functions implemented by the network device in the foregoing methods, and the communication 1320 may be used to implement the corresponding functions implemented by the first device in the foregoing methods. For brevity, details are not repeated herein again.

An embodiment of the present disclosure also provides a computer-readable storage medium for storing computer programs.

According to embodiments, the computer-readable storage medium may be applied to the terminal device in embodiments of the present disclosure, and the computer programs cause a computer to perform the corresponding processes implemented by the terminal device in each method embodiment of the present disclosure. For brevity, repeated descriptions are omitted here.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the first device in embodiments of the present disclosure, and the computer programs cause a computer to perform the corresponding processes implemented by the first device in each method embodiment of the present disclosure. For brevity, repeated descriptions are omitted here.

An embodiment of the present disclosure provides a computer program product, including computer program instructions.

According to embodiments, the computer program product may be applied to the terminal device in embodiments of the present disclosure, and the computer program instructions cause a computer to perform the corresponding processes implemented by the terminal device in each method embodiment of the present disclosure. For brevity, repeated descriptions are omitted here.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the first device in embodiments of the present disclosure, and the computer program instructions cause a computer to perform the corresponding processes implemented by the first device in each method embodiment of the present disclosure. For brevity, repeated descriptions are omitted here.

An embodiment of the present disclosure also provides a computer program.

According to embodiments, the computer program may be applied to the terminal device in embodiments of the present disclosure, and when the computer program runs on a computer, the computer is caused to perform the corresponding processes implemented by the terminal device in each method embodiment of the present disclosure. For brevity, repeated descriptions are omitted here.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the first device in embodiments of the present disclosure, and when the computer program runs on a computer, the computer is caused to perform the corresponding processes implemented by the first device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A terminal device, comprising:
a memory for storing computer programs; and
a processor;
wherein the processor is configured to execute the computer programs to:
determine a target group; and
join the target group to communicate with a network side;
wherein the terminal device further comprises a transceiver;
wherein the processor is configured to execute the computer programs to control the transceiver to receive second information sent by a network device, wherein the second information comprises attribute information of at least one group that a first device expects the terminal device to join;
wherein the processor is configured to:
determine the at least one group that the first device expects the terminal device to join based on the attribute information of the group that the first device expects the terminal device to join; and
determine the target group from the at least one group that the first device expects the terminal device to join.

2. The terminal device according to claim 1, wherein the processor is further configured to execute the computer programs to control the transceiver to:
send response information to the network device, wherein the response information comprises identification information of the target group.

3. The terminal device according to claim 1, wherein the processor is configured to:
determine at least one group supported by a network device according to second configuration information, wherein the second configuration information is sent from the network device to the terminal device, or the configuration information is pre-configured on the terminal device; and
determine the target group from the at least one group supported by the network device.

* * * * *